United States Patent Office 3,446,801
Patented May 27, 1969

3,446,801
CAROTENOID COMPOUNDS
Albert J. Chechak and Charles D. Robeson, Rochester, N.Y., assignors to Eastman Kodak Company, Rochester, N.Y., a corporation of New Jersey
No Drawing. Filed Mar. 23, 1966, Ser. No. 536,652
Int. Cl. C09b 23/12; C07c 43/20, 15/04
U.S. Cl. 260—240                    9 Claims

ABSTRACT OF THE DISCLOSURE

Novel carotenoid compounds, useful as food colorants and as additives in poultry feed, of the structural formula:

$$R-A_m-B_n-R'$$

where R is the 2,6,6-trimethylcyclohex-1-enyl radical, A is the divalent 3-methyl-1,3-butadienyl radical, B is the divalent ethylene radical, R' is the phenyl radical, the p-methoxyphenyl radical or the 2-furyl radical, m is 2 to 3, n is 1 to 4, and the sum of m and n is 4 to 6.

---

This invention resides in the chemical arts. More particularly it relates to that part of organic chemistry having to do with carotenoid compounds.

Carotenoid compounds are organic compounds of aliphatic molecular structure and of aliphatic-alicylic molecular structure which structures contain partly dehydrogenated isoprene groups (from 3 or 4 to 8 or more). These groups are present in a chain in such a way that the alternate single and double bonds (conjugated double bonds) form a chromophoric system.

In the feeding of poultry, particularly chickens, there is a need for materials which, when ingested by poultry, cause the skin and fat to acquire a yellow tint that is desired by certain ethnic groups, and produce a coloration in the yolks of eggs laid by such poultry, which coloration is desired by manufacturers of cake mixes, egg noodles and the like. Many commercial poultry feeds such as, for example, those based on milo as a substitute for corn, while otherwise quite adequate for poultry nutrition, are deficient in such materials.

A number of naturally occurring and known synthetic carotenoid compounds are poultry colorants or pigmenters. Representative of these compounds are lutein, zeaxanthin, canthaxanthin, physalien, halenien and β-apo-carotenoic acid methyl ester.

On the other hand a number of known carotenoid compounds are not deposited in poultry skin and fat and in poultry eggs to any appreciable extent. Representative of these compounds are the carotenes such as β-carotene, ε-carotene, bis-dehydro-β-carotene, and the like.

An object of this invention is to provide new carotenoid compounds which are poultry colorants or pigments.

There is also a need for edible food colorants suitable for coloring margarine, butter, cheese, fruit juice, soft drinks, candy and other foods.

Another object of this invention is to provide new carotenoid compounds which are useful as food colorants.

These and other objects as may appear hereinafter are achieved by this invention.

In summary, this invention comprises a group of new carotenoid compounds. The compounds of this group are represented by the generic formula:

$$R-A_m-B_n-R'$$

wherein R is the univalent 2,6,6-trimethylcyclohex-1-enyl radical, A is the divalent 3-methyl-1,3-butadienyl radical

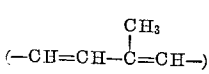

B is the divalent ethylene radical (—CH=CH—), R' is a radical selected from the group consisting of the phenyl radical, the p-methoxyphenyl radical and the 2-furyl radical, m is 2–3, n is 1–4 and the sum of m and n is 4–6.

Examples of compounds according to this generic formula comprise:

1-(2,6,6-trimethylcyclohex - 1 - enyl)-12-(2-furyl)-3,7-dimethyldodec-1,3,5,7,9,11-hexaene.

1-(2,6,6-trimethylcyclohex - 1 - enyl)-14-phenyl-3,7-dimethyltetradec-1,3,5,7,9,11,13-heptaene.

1-(2,6,6-trimethylcyclohex - 1 - enyl)-14-(2-furyl)-3,7-dimethyltetradec-1,3,5,7,9,11,13-heptaene.

1-(2,6,6-trimethylcyclohex - 1 - enyl)-14-phenyl-3,7,11-trimethyltetradec-1,3,5,7,9,11,13-heptaene.

1-(2,6,6-trimethylcyclohex - 1 - enyl)-14-(p-methoxyphenyl)-3,7,11 - trimethyltetradec-1,3,5,7,9,11,13-heptaene.

1-(2,6,6-trimethylcyclohex - 1 - enyl)-16-(phenyl)-3,7-dimethylhexadec-1,3,5,7,9,11,13,15-octaene.

1-(2,6,6-trimethylcyclohex - 1 - enyl)-16-(p-methoxyphenyl) - 3,7,11 - trimethylhexadec-1,3,5,7,9,11,13,15-octaene.

1-(2,6,6-trimethylcyclohex - 1 - enyl)-16-(2-furyl)-3,7-dimethylhexadec-1,3,5,7,9,11,13,15-octaene.

The compounds of this invention, when added to chicken feed free of skin and egg yolk pigmenters, cause the skin and fat of chickens ingesting the feed to have a yellowish tint and the yolks of their eggs to become yellow. In addition, the compounds of this invention are useful as food colorants.

The compounds of this invention generally are synthesized by coupling together by the Wittig reaction appropriate intermediates which are either commercially available or made by known reactions and procedures from commercially available chemicals.

This invention is further illustrated by the following working examples of various aspects of this invention, including preferred specific embodiments thereof. This invention is not limited to these specific embodiments unless otherwise indicated. In the examples typical quantities and light absorption data are given parenthetically. In addition, reference is made in most of the examples to the poultry shank skin coloration or pigmentation due to the carotenoid compound involved. This coloration or pigmentation was determined in actual tests wherein the carotenoid compound involved was actually fed for 7 days to 3-week old Hallcross White Leghorn cockerels which had been kept on a pigment-low diet from birth and which were depleted of skin pigments at the time the carotenoid compound involved was introduced into the diet. At the end of 7 days the shank skin pigmentation was assessed visually by a panel of four people and it is this pigmentation or color which is reported in the examples.

EXAMPLE 1

This example illustrates a specific embodiment of a process for the synthesis of 1-(2,2,6-trimethylcyclohex-1-enyl)-12-(2-furyl)-3,7-dimethyldodec-1,3,5,7,9,11-hexaene.

To a solution of retinol (3 grams) dissolved in methanol (20 milliliters) are added triphenylphosphine (3.48 grams) and 2.0 N methanolic hydrogen chloride (6.0 milliliters). The reaction mixture thus formed is stirred at 20° C. for 3 hours. It is then cooled to 0° C. 2 N methanolic potassium hydroxide (6.6 milliliters followed by a solution of 3-furylacrolein) (7.28 grams) in methanol (10 milliliters) are then admixed with the reaction mixture, forming a second reaction mixture. The second reaction mixture, is held at 0° C. for 2 hours, during which time solids form therein. These solids are separated by filtration, washed with methanol, water and methanol and then recrystallized from chloroform-methanol to give a product (0.65 gram) [E(1%, 1 cm., chloroform) (419 mu)=2,050] consisting essentially of 1-(2,6,6-trimethyl-cyclohex-1-enyl)-12-(2-furyl)-3,7-dimethyldodec - 1,3,5,7,9,11-hexaene.

The poultry shank skin coloration of this carotenoid compound is yellow-green.

EXAMPLE 2

This example illustrates a specific embodiment of a process for the synthesis of 1-(2,6,6-trimethylcyclohex-1-enyl)-14-phenyl-3,7 - dimethyltetradec - 1,3,5,7,9,11,13-heptaene.

Carboxymethylenetriphenylphosphonium bromide (47.3 grams) dissolved in ethanol (130 milliliters) is added at $-10°$ C. to sodium (2.3 grams) in ethanol (100 milliliters). The resulting solution is stirred for 5 minutes and the retinal (28.5 grams) dissolved in ethanol (110 milliliters) is added. The slurry which forms is allowed to stand for 18 hours at 20–25° C. and the ethanol solvent is then removed by evaporation. The residue is admixed with diethylether (100 milliliters), the solids which remain are removed by filtration and the filtrate is washed with 10% sulfuric acid, sodium bicarbonate and water. The washed filtrate is dried over anhydrous sodium sulfate and the ether removed by evaporation. The residue, a syrup, is dissolved in petroleum ether (B.P. 35–65° C.) solvent and chromatographed (sodium aluminum silicate) to give a product (28.4 grams) [E(1%, 1 cm., ethanol)[E(1%, 1 cm., ethanol)(387 mu)=1,284] consisting essentially of a $C_{22}$ acid ester.

A quantity (20 grams) of the $C_{22}$ acid ester product is dissolved in anhydrous diethylether (400 milliliters) and the solution thus formed is cooled to $-15°$ C. Lithium aluminum hydride (80 milliliters of a 0.8 molar solution) is added dropwise over 15 minutes to the solution while keeping the temperature at $-15°$ C. After 5 minutes acetone is added to the resulting mixture to destroy excess lithium aluminum hydride and the mixture thus obtained is washed with dilute sulfuric acid, 3% potassium hydroxide solution and water. The ether solution which remains is dried over sodium sulfate and the ether removed by evaporation to give a product (17.7 grams) [E(1%, 1 cm., ethanol)(355 mu)=910] consisting essentially of 5,9-dimethyl-11-(2,6,6-trimethplcyclohex-1-enyl)-undec - 2,4,6,8,10-pentaene-1-ol ($C_{22}$ alcohol).

To a quantity (2.0 grams) of the $C_{22}$ alcohol dissolved in methanol (4.0 milliliters) are admixed triphenylphosphine (1.7 grams) and 1.2 N methanolic hydrogen chloride (5.2 milliliters). The resulting triphenylphosphonium salt solution is stirred at 20–25° C. for 18 hours and then cooled to $-10°$ C. 2 N methanolic potassium hydroxide (3.5 milliliters) and cinnamaldehyde (0.45 gram) dissolved in methanol (4.5 milliliters) are admixed with the solution, forming a reaction mixture. This reaction mixture is left for 18 hours and during this time is permitted to warm to 20–25° C. During this period of time solids form in the reaction mixture. They are separated by filtration, washed with methanol, water and methanol and then crystallized from chloroform-methanol solution to give an orange solid product (0.23 gram) [E(1%, 1 cm., chloroform)(432 mu)=2,480] consisting essentially of 1-(2,6,6-trimethylcyclohex-1-enyl)-14-phenyl-3,7 - dimethyltetradec-1,3,5,7,9,11,13-heptaene.

The poultry shank skin color resulting from this carotenoid compound is yellow with a greenish cast.

EXAMPLE 3

This example illustrates a specific embodiment of a process for the synthesis of 1-(2,6,6-trimethylcyclohex-1-enyl)-14-(2-furyl)-3,7-dimethyltetradec-1,3,5,7,9,11,13 - heptaene.

To a quantity (3.0 grams) of $C_{22}$ alcohol, made as by the procedure described in Example 2, dissolved in methanol (10 milliliters) are added triphenylphosphine (2.52 grams) and 2 N methanolic hydrogen chloride (4.9 milliliters) and the resulting solution is stirred at 20–25° C. for 3 hours. The solution is then cooled to $-10°$ C. 2 N methanolic potassium hydroxide (5.0 milliliters) and 2-furylacrolein (1.0 gram) dissolved in methanol (3 milliliters) at $-10°$ C. are admixed with the solution, whereby a reaction mixture is formed. After about 2 hours, the solids which have formed in the reaction mixture are separated by filtration, washed with methanol, water and methanol, and then recrystallized from chloroform-methanol to give a product (0.28 gram) [E(1%, 1 cm., chloroform) (438 mu)=2,720] consisting essentially of 1-(2,6,6-trimethylcyclohex-1-enyl)-14-(2-furyl)-3,7 - dimethyltetradec-1,3,5,7,9,11,13-heptaene.

The poultry shank skin coloration resulting from this compound is yellow.

EXAMPLE 4

This example illustrates a specific embodiment of a process for the synthesis of 1-(2,6,6-trimethylcyclohex-1-enyl)-14-phenyl-3,7,11 - trimethyltetradec - 1,3,5,7,9,11,13-heptaene.

Retinal (24 grams) is dissolved in acetone (100 milliliters) and methanol (100 milliliters) is added. The solution thus formed is cooled to $-20°$ C. and 10% potassium hydroxide in methanol (100 milliliters) is added. The mixture is held for 18 hours at $-20°$ C. and then water (500 milliliters) and diethylether (500 milliliters) are admixed with the mixture, whereby an ether phase is formed. The ether phase is separated from the water phase, the diethylether removed by evaporation and the solids which remain are recrystallized from petroleum ether (B.P. 35–65° C.) to give an orange, crystalline product (6.5 grams) [E(1%, 1 cm., chloroform) (412 mu)=1,460] consisting essentially of retinylidene acetone.

To a quantity (2 grams) of retinylidene acetone in methanol (20 milliliters) is added potassium borohydride (0.35 gram) and the mixture is stirred for 1 hour. Diethylether (20 milliliters) is then added to the resulting reaction mixture, the resulting ether solution washed with water, dried over anhydrous sodium sulfate and then the ether removed by evaporation, giving a product (1.9 grams) [E(1%, 1 cm., chloroform) (366 mu)=1,500] consisting essentially of 6,10-dimethyl-12-(2,6,6-trimethylcyclohex-1-enyl)-dodec-3, 5, 7, 9, 11-pentaene-2-ol ($C_{23}$ alcohol).

A quantity (1.9 grams) of $C_{23}$ alcohol is dissolved in methanol (8 milliliters), and triphenylphosphine (1.62 grams) and 1.65 N methanolic hydrogen chloride (7.6 milliliters) are added to the solution. The solution which results is stored at 20° C. for 3 hours and then cooled to 0°. 2 N methanolic potassium hydroxide (6.9 milliliters) is added to the solution followed by cinnamaldehyde (1 milliliter) and the resulting solution is stirred for 3 hours at 20° C. During this time solids form in the solution. The solids are collected by filtration, washed with methanol, water and methanol, and then recrystallized from chloroform-methanol solution to give a crude product (0.18 gram) [E(1%, 1 cm., chloroform) (433 mu)=2,330]. The crude product is recrystallized from benzene to give a pure product [E(1%, 1 cm., chloroform (432 mu)=2,700] consisting essentially of 1-(2,6,6-trimethylcyclohex - 1 - enyl) - 14-phenyl-3,7,11-trimethyltetradec-1,3,5,7,9,11,13-heptaene.

The poultry shank skin coloration resulting from this compound is yellow with a slightly greenish cast.

EXAMPLE 5

This example illustrates a specific embodiment of a process for the synthesis of 1-(2,6,6-trimethylcyclohex-1 - enyl) - 14 - (p - methoxyphenyl) - 3,7,11 - trimethyltetradec-1,3,5,7,9,11,13-heptaene.

To a cooled ($-20°$ C.) solution of retinal (32.2 grams) in acetone (100 milliliters) is added a cold solution of potassium hydroxide (10 grams) in methanol (100 milliliters). The reaction mixture is stored at room temperature for 1 hour and the deep red solution then diluted with ether and washed with water until washings were neutral. After drying the ether solution over anhydrous sodium sulfate, the solvent is evaporated, and the residue dissolved in petroleum ether (Skellysolve F, 200 milliliters) and cooled to −20° overnight and filtered. Because filtration yields only a small crop (5.6 grams) of crystals, the filtrate is chromatographed on a column of sodium aluminum silicate (Doucil, 612 grams). The nonadsorbed fractions and the ether eluate of the bottom half of the column are combined and evaporated to give a red oil (29.5 grams) [E(1%, 1 cm., cyclohexane) (403 mu)=1,130]. The oil is dissolved in petroleum ether (B.P. 35–65° C.) (280 milliliters) and allowed to crystallize at −20° C. for four days. The solids are collected and combined with the solids separated by filtering before chromatography. These solids (17.6 grams) [E(1%, 1 cm. cyclohexane) (403 mu)=1,450] consist essentially of 6,10-dimethyl - 12 - (2,6,6 - trimethylcyclohex - 1-enyl)-dodeca-3,5,7,9,11-pentaen-2-one ($C_{23}$ ketone).

A quantity (16.1 grams, 0.05 mole) of the $C_{23}$ ketone is dissolved in ether (125 milliliters) in a red flask. Potassium borohydride (1.33 grams, 0.025 mole) and methanol (250 milliliters) are added to the ketone and the flask is capped with a condenser protected by a drying tube. The solution is stirred magnetically for 4 hours. Diethyl ether (100 milliliters) is then added and the solution washed with dilute acid and finally with water. The ether solution is then dried over sodium sulfate, filtered and the ether evaporated off under vacuum. The residue (16 grams) consists essentially of 6,10-dimethyl-12-(2,6,6-trimethylcyclohex - 1 - enyl) - dodeca - 3,5,7,9,11 - pentaen 2-ol. [E(1%, 1 cm.) (357 mu)=1,450]. It is a $C_{23}$ alcohol.

p-Anisaldehyde (136 grams, 1.0 mole) is refluxed for 10 minutes with a mixture of ethyl orthoformate (162 grams, 1.1 moles), absolute ethanol (138 grams, 3.0 moles), and ammonium chloride (2.3 grams). The fraction boiling below 70° C. at 15 milliliters Hg pressure is then distilled off. On cooling the residue, diethyl ether is added to it and the resulting solution washed with several portions of dilute base, dried over potassium carbonate and filtered. The ether is then distilled off. The residue was distilled under vacuum to give a product (146 grams (B.P. 136–142° C. at 17 millimeters mercury pressure) consisting essentially of p-anisaldehyde diethylacetal.

p-Anisaldehyde diethylacetal (106 grams, 0.51 mole) is placed in a 300 milliliter, 3-necked, round bottom flask equipped with thermometer, stirrer, a dropping funnel protected by a driving tube, and a heating mantle. A solution of zinc chloride in ethyl acetate (5.5 milliliters) of a 10% solution prepared from zinc chloride previously vacuum dried at 150° C. is added and the solution stirred vigorously and heated to 40° C. Vinyl ethyl ether (40 grams, 0.55 mole) is added dropwise at such a rate that the temperature of the solution does not rise above 45° C. (about 2 hours). After the addition is complete the solution is stirred and maintained at 40–45° C. for 1 hour. On cooling, diethyl ether is added, the solution washed with dilute aqueous base, dried over potassium carbonate, filtered, and the ether distilled off. The residue is distilled under vacuum to give a product (118 grams) (B.P. 177–192° C. at 17 millimeters mercury pressure) consisting essentially of 1,1,3-triethoxy - 3 - (p-methoxyphenyl)-propane.

1,1,3-triethoxy-3-(methoxyphenyl)-propane (50 grams, 0.18 mole) is placed in a 500 milliliter, 3-necked round bottom flask equipped with a stirrer, thermometer, and nitrogen inlet. A solution of sodium acetate trihydrate (29.4 grams) in glacial acetic acid (177 milliliters) is added and the mixture stirred and heated on a steam bath in a nitrogen atmosphere for 4 hours. The mixture is allowed to cool somewhat and is added with agitation to a mixture of crushed ice (140 grams) and water (140 grams). A yellow precipitate results. It is collected by filtering, washed with dilute sodium bicarbonate, dried over calcium chloride, and distilled under vacuum, the major fraction boiling at 114–116° C. at 0.18–0.20 millimeter mercury pressure. This fraction is recrystallized once from methanol to give a product (23 grams), (M.P. 58.5–59.5° C.) [E(1%, 1 cm., cyclohexane) (318 mu)= 1,810] consisting essentially of p-methoxy-cinnamaldehyde.

6,10-dimethyl-12-(2,6,6-trimethylcyclohex - 1 - enyl)-dodeca-3,5,7,9,11-pentaene - 2 - ol (2.02 grams, 0.0062 mole) and triphenylphosphine (1.67 grams, 0.0064 mole) are dissolved in methanol (3 milliliters) in a 50 milliliter, 3-necked, pear shaped flask equipped with a stirrer and a dropping funnel protected by a drying tube. The flask is flushed with nitrogen and cooled to 0–5° C. with an ice bath. 3.4 n-methanolic hydrochloric acid (1.9 milliliters) is then added dropwise with 2 stirring. The resulting solution is stirred for 2 hours. The clear solution is transferred to a dropping funnel equipped with a drying tube. p-Methoxycinnamaldehyde (1.00 gram, 0.0062 mole) is dissolved in methanol (3 milliliters) in a 50 milliliter, 3-necked, pear shaped flask equipped with a stirrer, the dropping funnel containing the clear solution, and a dropping funnel containing 2 N methanolic potassium hydroxide (3.25 milliliters). The flask is flushed with nitrogen, chilled to −20° C., and stirring begun. The contents of the dropping funnels are added simultaneously over 10–20 minutes. The reaction mixture that is formed is allowed to warm to 0–5° C., stirred at this temperature for 5 hours and then at 20–25° C. for 2 more hours. A slurry is the result. It is filtered. The cake is washed with methanol and water, and then recrystallized twice from chloroform-methanol giving a product (0.25 gram) M.P. 193–195° C.) [E(1%, 1 cm., cyclohexane) (437 mu)=2,510] consisting essentially of 1-(2,6,6-trimethylcyclohex-1-enyl)-14-(p-methoxyphenyl)-3,7,11 - trimethyltetradec-1,3,5,7,9,11,13-heptaene.

The poultry shank skin pigmentation resulting from this compound is yellow with a greenish cast.

EXAMPLE 6

This example illustrates a specific embodiment of a process for the synthesis of 1-(2,6,6-trimethylcyclohex-1-enyl)-(16-phenyl)-3,7-dimethylhexadec-1,3,5,7,9,11,13,15-octaene.

Cinnamaldehyde (28 milliliters) is condensed with crotonaldehyde (35 milliliters) in ethanol (105 milliliters) and water (45 milliliters) in the presence of piperidine (6 grams) and acetic acid (6 milliliters) according to the procedure of Schmitt, Ann. 547, 270 (1941). There is thereby obtained a product (4.7 grams) [E(1%, 1 cm., ethanol) (355 mu)=2,500] consisting essentially of 7-phenylhepta-2,4,6-trien-1-al.

Retinol (2 grams) is dissolved in methanol (10 milliliters) and to the solution are added triphenylphosphine (2.3 grams) and 1.2 N methanolic hydrogen chloride (6.6 milliliters). Half of this salt solution is cooled to −10° C. and 2.0 N methanolic potassium hydroxide (2 milliliters) followed by 7-phenyl-hepta-2,4,6-trien-1-al (0.7 gram) are admixed with it. The slurry that forms is stored for 18 hours and during this time is allowed to warm to 20–25° C. The solids are filtered off, washed with water and methanol, and then recrystallized from chloroform-methanol to give a product (0.56 g.) [E(1%, 1 cm., chloroform) (452 mu)=2,800] consisting essentially of 1-(2,6,6-trimethylcyclohex-1-enyl)-16-phenyl-3,7 - dimethylhexadec-1,3,5,7,9,11,13,15-octaene.

The poultry shank skin coloration resulting from 1-(2,6,6-trimethylcyclohex-1-enyl)-16-phenyl-3,7 - dimethylhexadec-1,3,5,7,9,11,13,15-octaene is yellow.

EXAMPLE 7

This example illustrates a specific embodiment of a process for the synthesis of 1-(2,6,6-trimethylcyclohex-1-enyl)-16-(p-methoxyphenyl) - 3,7,11 - trimethylhexadec-1,3,5,7,9,11,13,15-octaene.

p-Methoxycinnamaldehyde (184 grams, 1.14 moles), ethyl orthoformate (202 grams, 1.37 moles), absolute ethanol (200 milliliters), and ammonium chloride (2.6 grams) are refluxed together for ½ hour. The solvents boiling below 85° C. are then distilled off and the residue, on cooling, is diluted with diethyl ether. The resulting solution is then washed with dilute base, dried over potassium carbonate, filtered and the solvent removed by evaporation. The residual oil is distilled under vacuum to give a product (215 grams) (B.P. 119–125° C. at 0.2–0.3 milliliters mercury pressure) [E(1%, 1 cm., cyclohexane) (264 mu)=870] consisting essentially of p-methoxycinnamaldehydediethylacetal.

p-Methoxycinnamaldehyde diethylacetal (101.5 grams, 0.43 mole) is placed in a 300 milliliter, 3-necked flask equipped with a thermometer, stirrer, and a vented addition funnel protected by a drying tube. A solution of zinc chloride in ethyl acetate (4.5 milliliters of a 10% solution prepared from zinc chloride previously vacuum dried at 150° C.) is added and the resulting solution stirred and heated to 35° C. Vinyl ethyl ether (32.5 grams, 0.45 mole) is added dropwise at such a rate that the temperature of the solution does not rise above 45° C. Midway through the addition the temperature begins to fall and additional zinc chloride solution (2 milliliters) is added. After the addition is complete (about 2 hours) the solution is stirred and maintained at 40±2° C. for 2 hours. Sodium carbonate (10 grams) is then added and the solution allowed to cool. Diethyl ether is added and the solution is washed with dilute base and dried over potassium carbonate. The solution is then filtered and the ether distilled from the filtrate. The residue is vacuum distilled whereby a product (86 grams) (B.P. 137–145° C. at 0.13–0.17 milliliters mercury pressure) consisting essentially of 1,1,3-triethoxy-5-(p-methoxyphenyl)-pent-4-ene is obtained.

A quantity (0.86 gram, 0.28 mole) of this product is placed in a 500 milliliter, 3-necked, round bottom flask equipped with a thermometer, stirrer and nitrogen inlet. A solution of sodium acetate trihydrate (49.2 grams) in glacial acetic acid (270 milliliters) is added and the solution stirred and heated on a steam bath in a nitrogen atmosphere for 4 hours. It is then poured into a mixture of crushed ice (300 grams) and water (250 milliliters) with vigorous stirring. The precipitate that forms is collected by filtration and washed with dilute sodium bicarbonate and finally with water. After drying in a desiccator over Drierite desiccant, the crude product is recrystallized once from hexane and once from methanol giving a product (37 grams, M.P. 79° C.) [E(1%, 1 cm., cyclohexane) (348 mu=1,770] consisting essentially of 5-(6-methoxyphenyl)-penta-2,4-dienal.

A quantity (2.01 grams, 0.0062 mole) of the $C_{23}$ alcohol described in Example 5 and triphenylphosphine (1.66 grams, 0.0064 mole) are dissolved in methanol (3 milliliters) in a 50 milliliter, 3-necked, pear shaped flask equipped with a stirrer and a dropping funnel protected by a drying tube. The flask is flushed with nitrogen and cooled to 0–5° C. with an ice bath. 3.4 N methanolic hydrochloric acid (1.9 milliliters) is then added dropwise with stirring. The resulting solution is stirred for 2 hours. The clear solution is transferred to a dropping funnel equipped with a drying tube.

5-(p-methoxyphenyl)-penta - 2,4 - dienal (1.25 grams, 0.0067 mole) is dissolved in methanol (3 milliliters) in a 50 milliliters, 3-necked, pear shaped flask equipped with a stirrer, a dropping funnel containing the clear solution and protected by a drying tube, and a dropping funnel containing 2 N methanolic potassium hydroxide (3.25 milliliters). The flask contents are cooled to −20° C. and stirred, and the contents of the dropping funnels are added simultaneously thereto over 20 minutes. The resulting mixture is stirred at 0.5° C. for 45 minutes and stored at 6° C. for 12 hours. The mixture is then filtered and the filter cake washed with methanol. The washed filter cake is recrystallized from chloroform-methanol twice and once from benzene-ethyl formate giving a product (0.21 gram, M.P. 199–201° C.) [E(1%, 1 cm., cyclohexane) (454 mu)=2,620] consisting essentially of 1 - (2,6,6 - trimethylcyclohex - 1 - enyl) - 16 - (p - methoxyphenyl) - 3,7,11 - trimethylhexadec - 1,3,5,7,9,11,13,15-octaene.

The poultry shank skin pigmentation resulting from this carotenoid is yellow.

EXAMPLE 8

This example illustrates a specific embodiment of a process for the synthesis of 1-(2,6,6-trimethylcyclohex-1-enyl) - 16 - (2 - furyl) - 3,7 - dimethylhexadec - 1,3,5,7, 9,11,13,15-octaene.

2-furyl acrolein (30 grams) is condensed with crotonaldehyde (37.5 grams) in ethanol (105 milliliters) and water (45 milliliters in the presence of piperidine (7 milliliters) and acetic acid (6 milliliters) according to the procedure of Schmitt, Ann., 547, 270 (1941), resulting in a product (1.08 grams) [E(1%, 1 cm., ethanol) (375 mu)=2,000] consisting essentially of 7-(2-furyl)-hepta-2,4,6-trien-1-al.

Retinol (2 grams) is dissolved in methanol (10 milliliters) triphenylphosphine (2.3 grams) and 1.2 N methanolic hydrogen chloride (6.6 milliliters) are added and the resulting salt solution stirred at 20–25° C. for 18 hours. Half of this salt solution is cooled to −10° C. and admixed with it are 2.0 N methanolic potassium hydroxide (2 milliliters) followed by 7-(2-furyl)-hepta-2,4,6-trien-1-al (1.7 grams). The resulting slurry is allowed to stand at 20–25° C. for 3 hours. The solids are then filtered off, washed with water and methanol, and recrystallized from chloroform/methanol to give a product (0.20 gram) [E(1%, 1 cm., chloroform) (455 mu)=2,-400] consisting essentially of 1-(2,6,6-trimethylcyclohex-1 - enyl) - 16 - (2 - furyl) - 3,7 - dimethylhexadec - 1,3,5, 7,9,11,13,15-octaene.

The poultry shank skin pigmentation resulting from this carotenoid is yellow.

Thus, this invention provides a group of new carotenoid compounds which function, when ingested by poultry, to pigment poultry skin. These compounds also cause pigmentation of egg yolks when ingested by egg laying poultry. Moreover, these compounds have utility as food colorants.

Other features, advantages and specific embodiments of this invention will be readily apparent to those in the exercise of ordinary skill in the art to which this invention pertains after reading the foregoing disclosures. In this regard, while specific embodiments of processes for the synthesis of compounds of this invention have been described in considerable detail, variations and modifications of these embodiments can be effected without departing from the spirit and scope of the invention as disclosed and claimed.

We claim:
1. A compound according to the formula:

$$R-A_m-B_n-R'$$

wherein R is the 2,6,6-trimethylcyclohex-1-enyl radical, A is the divalent 3-methyl-1,3-butadienyl radical, B is the divalent ethylene radical, R' is a radical selected from the group consisting of the phenyl radical, the p-methoxyphenyl radical and the 2-furyl radical, $m$ is 2–3, $n$ is 1–4 and the sum of $m$ and $n$ is 4–6.

2. 1 - (2,6,6 - trimethylcyclohex - 1 - enyl) - 12 - (2-furyl)-3,7-dimethyldodec-1,3,5,7,9,11-hexaene.

3. 1 - (2,6,6 - trimethylcyclohex - 1 - enyl) - 14 - phenyl-3,7-dimethyltetradec-1,3,5,7,9,11,13-heptaene.

4. 1 - (2,6,6 - trimethylcyclohex - 1 - enyl) - 14 - (2-furyl) - 3,7 - dimethyltetradec - 1,3,5,7,9,11,13 - heptaene.

5. 1 - (2,6,6 - trimethylcyclohex - 1 - enyl) - 14 - phenyl-3,7,11 - trimethyltetradec - 1,3,5,7,9,11,13 - heptaene.

6. 1 - (2,6,6 - trimethylcyclohex - 1 - enyl) - 14 - (p-methoxyphenyl) - 3,7,11 - trimethyltetradec - 1,3,5,7,9, 11,13-heptaene.

7. 1 - (2,6,6 - trimethylcyclohex - 1 - enyl) - 16 - (phenyl) - 3,7 - dimethylhexadec - 1,3,5,7,9,11,13,15 - octaene.

8. 1 - (2,6,6 - trimethylcyclohex - 1 - enyl) - 16 - (p-methoxyphenyl) - 3,7,11 - trimethylhexadec - 1,3,5,7,9,11,13,15-octaene.

9. 1 - (2,6,6 - trimethylcyclohex - 1 - enyl) - 16 - (2-furyl) - 3,7 - dimethylhexadec - 1,3,5,7,9,11,13,15 - octaene.

References Cited

UNITED STATES PATENTS 3,184,516   5/1965   Chechak et al. _____ 260—666

OTHER REFERENCES

Elsevier, Chemistry of Carbon Compounds, vol. IIA, "Carotenoid Group," pp. 382 to 383, Elsevier Publishing Co., Amsterdam, Holland (1953).

JOHN D. RANDOLPH, *Primary Examiner.*

U.S. Cl. X.R.

99—4, 113, 117, 123, 148; 260—586, 598, 612, 617, 666